Patented Sept. 7, 1954

2,688,638

UNITED STATES PATENT OFFICE 2,688,638

N-(β-PHENOXYETHYL) HALOETHYLAMINES

William S. Gump, Upper Montclair, and Edward Joseph Nikawitz, Passaic, N. J., assignors to The Givaudan Corporation, New York, N. Y., a corporation of New Jersey No Drawing. Application July 17, 1951, Serial No. 237,281

6 Claims. (Cl. 260—570.7)

This invention relates to certain haloamines and their salts, and more especially to haloamines which may be represented by the following general structural formula:

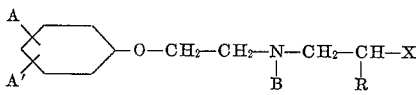

wherein A and A' are selected from H, lower alkyl and alkoxy, B is selected from alkyl, 1-naphthylmethyl, benzyl, alkyl-substituted benzyl, alkoxy-substituted benzyl, 2-phenoxyethyl, alkyl-substituted 2-phenoxyethyl and alkoxy-substituted 2-phenoxyethyl, R is selected from H and alkyl and X is a halogen. The salts contemplated by this invention are the salts of the aforementioned haloamines and inorganic acids such as sulfuric, hydrochloric, hydrobromic, nitric or phosphoric acids, and the corresponding salts of alkane sulfonic acids, such as methyl-, ethyl-, and propyl-sulfonic acids.

In general, these compounds are prepared by reacting (1)
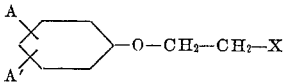

and (2) N-alkyl-2-aminoethanol, N-(1-naphthylmethyl)-2-aminoethanol, N-benzyl-2-aminoethanol, N-(alkyl-substituted-benzyl)-2-aminoethanol, N-(alkoxy-substituted-benzyl)-2-aminoethanol, N - (2 - phenoxyethyl) - 2 - aminoethanol, N-(alkoxy-substituted-2-phenoxyethyl)-2-aminoethanol or N-(alkyl-substituted-2-phenoxyethyl)-2-aminoethanol, or the corresponding aminopropanols, A, A' and X having the aforementioned meanings.

When B and the radical represented by

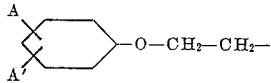

are the same, the reactants are the halide of the last indicated radical and 2-aminoethanol or 1-amino-2-propanol.

The reaction product is then treated with a halogenating agent such as thionyl chloride or thionyl bromide, in order to substitute a halogen in place of the hydroxyl group.

The thionyl chloride treatment results in the formation of the hydrochlorides of the haloamines represented by the foregoing general structural formula, X being Cl. The thionyl bromide treatment results in the formation of the hydrobromides of the haloamines represented by the foregoing general structural formula, X being Br.

If the haloamines or salts other than the hydrochlorides or hydrobromides are desired, they may be obtained by treating the aforementioned hydrochlorides or hydrobromides with alkaline agents, preferably aqueous potassium carbonate at a temperature around 30° C. Such treatment results in the formation of the free bases, i. e., the haloamines. These may then be neutralized with the desired acid to form the desired salts.

In general the novel haloamines are viscous liquids and the novel salts are crystalline solids. Both classes of compounds are difficultly soluble in water, but soluble in organic solvents such as ethyl alcohol, propylene glycol and acetone.

The new haloamines of this invention are characterized by their boiling points at reduced pressure and their refractive indices, taken at 20° C.

The novel compounds are suitable for medicinal use and for use in chemical synthesis. They are excellent sympatholytic and adrenolytic agents and also possess anti-histaminic properties. For therapeutic purposes, these compounds, preferably in the form of their salts, may be administered orally or parenterally, and may be employed in the form of tablets or in solutions.

In order to illustrate this invention more fully, but without thereby limiting it, the following examples are given.

EXAMPLE 1

*Preparation of N-(2-chloroethyl)-N-(2-phenoxyethyl)-benzylamine hydrochloride*

(a) PREPARATION OF N-BENZYL-N-(2-PHENOXYETHYL)-2-AMINOETHANOL 94.2 grams of β-chlorophenetole (M. P. 23.5°–24° C.) were dropped under stirring into 181.2 grams of N-benzyl-2-aminoethanol over a period of one hour, while maintaining a temperature of 110°–120° C. The mixture was agitated and heated to 120°–130° C. for 6 hours.

A solution of 30 grams of sodium hydroxide in 240 cc. of water was added to the reaction mixture after completion of the foregoing treatment. Benzene (200 cc.) was then added and the benzene layer was separated and washed twice with 200 cc. of water. Anhydrous sodium sulfate (about 20 grams) was used to dry the washed benzene extract, which was then filtered to remove the salt. The benzene was removed by atmospheric distillation, and the residue was subjected to distillation under high vacuum (5 mm. of mercury).

After lower boiling material distilled over, 127 grams of the desired N-benzyl-N-(2-phenoxyethyl)-2-aminoethanol, distilling at 205°–225° C., were obtained. Upon redistillation, under 6 mm. of mercury, this latter fraction yielded 110 grams of substantially pure N-benzyl-N-(2-phenoxyethyl)-2-aminoethanol; B. P. 207°–213° C.; $n_D^{20}$ 1.5599.

(b) PREPARATION OF N-(2-CHLOROETHYL)-N-(2-PHENOXYETHYL)-BENZYLAMINE HYDROCHLORIDE

Sixty grams of thionyl chloride in 100 cc. of chloroform were dropped into a stirred, ice-cooled solution of 90 grams of N-benzyl-N-(2-phenoxyethyl)-2-aminoethanol, prepared in accordance with part (a) above, in 200 cc. of chloroform. The addition took one hour.

The reaction mixture was allowed to stand at room temperature (25° C.) for 12 hours after completion of the foregoing treatment, and the solvent was then removed by distilling under atmospheric pressure up to 80° C. The residue was moistened with 20 cc. of ethyl alcohol and the latter was removed by heating to 100° C. at a vacuum of 100 mm. of mercury.

The residue was dissolved in 205 cc. of boiling absolute ethyl alcohol in the presence of 2 grams of decolorizing carbon. The solution was filtered and the filtrate was mixed with 700 cc. of ethyl ether and then placed in a refrigerator. After a few hours crystallization was accomplished. The crystals were filtered, washed with ethyl ether and filtered practically dry through a Buechner funnel. The foregoing recrystallization procedure was repeated twice, first using 150 cc. of alcohol to dissolve and 500 cc. of ethyl ether, and then by using 150 cc. of ethyl alcohol to dissolve and 450 cc. of ethyl ether.

After drying, 40 grams of the desired material, N-(2-chloroethyl)-N-(2-phenoxyethyl) benzylamine hydrochloride, having a melting point of 105°–108° C. and being slightly cream-colored, were obtained.

| Analysis | Calculated | Found |
|---|---|---|
| Percent Cl ionized | 10.9 | 11.3 |
| Percent Cl total | 21.8 | 21.8 |

EXAMPLE 2

Preparation of N-(2-chlorethyl)-di-(2-phenoxyethyl)-amine hydrochloride (a) PREPARATION OF N,N-DI-(2-PHENOXYETHYL)-2-AMINOETHANOL 156 grams of β-chlorophenetole were dropped, under stirring, into 62 grams of 2-aminoethanol over a period of one hour at 100°–110° C. The mixture was then heated to 120° C. and maintained thereat, under stirring, for 6 hours.

A solution of 40 grams of sodium hydroxide in 200 cc. of water was added to the reaction mixture after completion of the foregoing treatment. Benzene (200 cc.) was then added and the benzene layer was separated and washed twice with 200 cc. of water. Anhydrous sodium sulfate (about 20 grams) was used to dry the washed benzene extract, which was then filtered to remove the salt. The benzene was removed by atmospheric distillation, and the residue was subjected to high vacuum distillation (4 mm. of mercury).

After lower boiling material distilled over, 74.9 grams, distilling at 225°–265° C., were obtained. Upon redistillation, 39.6 grams of substantially pure N,N-di-(2-phenoxyethyl)-2-aminoethanol were obtained; B. P. 245–250° C. (5 mm. of mercury); $n_D^{20}$ 1.5548.

(b) PREPARATION OF N-(2-CHLOROETHYL)-DI-(2-PHENOXYETHYL)-AMINE HYDROCHLORIDE

A solution of 20 grams of thionyl chloride in 100 cc. of chloroform was dropped into a solution of 200 cc. of chloroform and 35.5 grams of N,N-di-(2-phenoxyethyl)-2-aminoethanol, as prepared in Example 2(a) above. The procedure of Example 1(b) was followed from this point except that 100 cc. of alcohol and 200 cc. of ether were used for the first crystallization and 70 cc. of alcohol and 180 cc. of ether for the second one. 20 grams of the desired material, N-(2-chloroethyl)-di-(2-phenoxyethyl)-amine hydrochloride, having a melting point of 129°–130° C. and being white in color, were obtained.

| Analysis | Calculated | Found |
|---|---|---|
| Percent Cl ionized | 10.0 | 10.2 |
| Percent Cl total | 19.9 | 19.9 |

EXAMPLE 3

Preparation of N-(2-chloroethyl)-di-(2-o-toloxyethyl)-amine hydrochloride (a) PREPARATION OF N,N-DI-(2-O-TOLOXYETHYL)-2-AMINOETHANOL Sixty-eight grams of 2-chloroethyl-o-tolylether, prepared in accordance with the method given in Example 5, part (b), were dropped into 25 grams of 2-aminoethanol over a period of 2 hours, while agitating the mixture and maintaining a temperature of 110° C.

The procedure of Example 2(a) was followed from this point, 18 grams of substantially pure N,N-di-(2-o-toloxyethyl)-2-aminoethanol, distilling at 223°–243° C. under a pressure of 3 mm. of mercury being obtained.

(b) PREPARATION OF N-(2-CHLOROETHYL)-DI-(2-O-TOLOXYETHYL)-AMINE HYDROCHLORIDE

A solution of 10 grams of thionyl chloride in 100 cc. of chloroform was dropped into a solution of 15 grams of N,N-di-(2-o-toloxyethyl)-2-aminoethanol, as prepared in Example 3(a) above and 200 cc. of chloroform. The procedure of Example 1(b) was followed from this point except that 70 cc. of alcohol and 200 cc. of ether were used for the first crystallization and 50 cc. of alcohol, 300 cc. of ether for the second, and 30 cc. of alcohol and 200 cc. of ether for the third. Six grams of the desired material, N-(2-chloroethyl)-di-(2-o-toloxyethyl)-amine hydrochloride, having a melting point of 139°–142° C., and being slightly cream colored, were obtained.

| Analysis | Calculated | Found |
|---|---|---|
| Percent ionized Cl | 9.3 | 9.8 |
| Percent total Cl | 18.5 | 19.0 |

EXAMPLE 4

Preparation of N-(2-chloroethyl)-di-(2-p-toloxyethyl)-amine hydrochloride (a) PREPARATION OF N,N-DI-(2-P-TOLOXYETHYL)-2-AMINOETHANOL 170.5 grams of 2-chloroethyl-p-tolyl ether, B. P. 92°–97° C. at 5 mm. of mercury pressure, prepared in accordance with the method of Example 5, part (b), except that p-cresol was used in place of o-cresol, were dropped into 61 grams of 2-aminoethanol over a period of one hour.

while agitating the mixture and maintaining a temperature of 110° C.

The procedure of Example 2(a) was followed from this point, 63 grams of substantially pure N,N-di(2-p-toloxyethyl)-2-aminoethanol distilling at 230°–250° C. under a pressure of 3 mm. of mercury being obtained.

(b) PREPARATION OF N-(2-CHLOROETHYL)-DI-(2-P-TOLOXYETHYL)-AMINE HYDROCHLORIDE

A solution of 20 grams of thionyl chloride in 100 cc. of chloroform was dropped into a solution of 50 grams of N,N-di-(2-p-toloxyethyl)-2-aminoethanol, as prepared in Example 4(a) above and 100 cc. of chloroform.

The procedure of Example 1(b) was followed from this point except that 100 cc. of alcohol followed by 260 cc. of ether were used for the first crystallization and 120 cc. of alcohol were used for the second. 24 grams of the desired material, N - (2 - chloroethyl) - di - (2 - p - toloxyethyl) - amine hydrochloride, having a melting point of 147°–150° C., and being white in color, were obtained.

| Analysis | Calculated | Found |
|---|---|---|
| Percent ionized Cl | 9.3 | 9.6 |
| Percent total Cl | 18.5 | 17.9 |

EXAMPLE 5

*Preparation of N-(2-chloroethyl)-N-(2-o-toloxyethyl)-1-naphthylmethylamine hydrochloride*

(a) PREPARATION OF N-(1-NAPHTHYLMETHYL)-2-AMINO ETHANOL

|  | Grams |
|---|---|
| 1-(chloromethyl) naphthalene | 176.45 |
| 2-aminoethanol | 490.0 |

The chloride was dropped during 2 hours at 100° C. inside temperature into the amino alcohol, the mixture being stirred in a 3 liter round bottom flask fitted with mercury seal, reflux condenser, thermometer and stirrer. Heating was then continued for 2 hours. After cooling to room temperature, 40 grams of caustic soda in 40 cc. of water and 200 cc. of alcohol were added to precipitate the salt which was separated from the solution by filtration. The solvent was removed by distillation in low vacuum. High vacuum distillation yielded the following fractions:

(1) At 4 mm., 190–194° C., 3.0 grams.
(2) At 4 mm., 194–214° C., 153.5 grams.

Fraction 2 was redistilled.

(1a) At 4 mm., 190–194° C., 5.0 grams.
(2b) At 4 mm., 194–206° C., 140.0 grams, brown oil.

Fraction 2b represented the desired compound with a purity of 100.5% (determined by potentiometric titration); $n_D^{20}$ 1.6195.

(b) PREPARATION OF 2-CHLOROETHYL-O-TOLYL ETHER 2-o-toloxyethanol was prepared as follows:

Ortho-cresol (760 grams), ethyl alcohol (1,000 cc.) and sodium hydroxide solution (280 grams in 300 cc. of water) were charged into a 4 liter round bottom flask, fitted with stirrer, reflux condenser and dropping funnel. Ethylene chlorohydrin (580 grams) was dropped during 2 hours into the refluxing contents of the flask. Refluxing and agitating were continued for 5 hours.

The solution was then allowed to remain at room temperature overnight to accomplish the precipitation of the salt as completely as possible. After separation of the salt by filtration, the solvent was distilled off at low vacuum. The residue was dissolved in 800 cc. of benzene and the benzene solution was washed twice with 500 cc. of water. Drying with anhydrous sodium sulfate, filtration and distillation of the solvent preceded high vacuum distillation in an 18 inch asbestos covered Vigraux column.

The following fractions were obtained:

(1) At 4 mm., 100–106° C., 22.2 grams.
(2) At 4 mm., 106–115° C., 858.0 grams.

Fraction 2 was redistilled.

(1a) At 4 mm., until 105° C., 10.0 grams.
(2b) At 4 mm., 105–110° C., 813.0 grams.

Fraction 2b, a colorless oil, represented the desired compound, 2-o-toloxyethanol, $n_D^{20}$ 1.5350; purity of 100% (determined by acetylation).

Pyridine (420 grams) and a solution of 800 grams of 2-o-toloxyethanol in 800 cc. of chloroform were charged into a 5 liter round bottom flask fitted with stirrer, dropping funnel and reflux condenser, being cooled in an ice bath. A thionyl chloride solution (680 grams of thionyl chloride in 600 cc. of chloroform) was dropped into the stirred mixture during 2 hours. The cooling bath was removed after completion of the addition and the solution was permitted to remain at room temperature overnight. About 60% of the solvent was then removed by distillation at atmospheric pressure. A rather vigorous development of sulfur dioxide could be noticed at this stage. The residual part was washed twice with 500 cc. of water and dried with anhydrous sodium sulfate. The rest of the solvent was removed by distillation in low vacuum.

High vacuum distillation of the residue yielded the following fractions:

(1) At 4 mm., 87–90° C., 10.0 grams discarded.
(2) At 4 mm., 90–95° C., 802.1 grams.

Fraction 2 represented the desired compound; $n_D^{20}$ 1.5280; purity 98% (based on chlorine determination).

(c) PREPARATION OF N-(1-NAPHTHYLMETHYL)-N-(2-O-TOLOXYETHYL)-2-AMINOETHANOL

|  | Grams |
|---|---|
| N-(1-naphthylmethyl)-2-amino ethanol | 68.0 |
| 2-chloroethyl-o-tolylether | 29.0 |

The halogen compound was dropped during 2 hours at 120° C. inside temperature into the amino alcohol, the mixture being stirred in a 500 cc. round bottom flask fitted with mercury seal, thermometer, reflux condenser and stirrer. Heating to 120° C. and stirring were continued for 8 hours. 200 cc. of a 10% caustic soda solution were then added and the organic matter was shaken out with 300 cc. of benzene. The solution which was obtained was separated from the aqueous layer and washed twice with 300 cc. of water. Drying with anhydrous sodium sulfate, filtration and removal of the solvent by distillation in low vacuum made the product ready for high vacuum distillation. The following fractions were obtained:

(1) At 4 mm., 110–185° C., 4 grams.
(2) At 4 mm., 185–210° C., 5 grams.
(3) At 4 mm., 210–300° C., 42 grams.

Fraction 3 was redistilled.

(1a) At 4 mm., 100–265° C., 15 grams.
(2b) At 4 mm., 265–285° C., 31 grams, heavy, brown oil.

Fraction 2b was the desired compound.

| Analysis | Calculated | Found |
|---|---|---|
| Percent C | 78.8 | 80.8 |
| Percent H | 7.46 | 7.34 |

(d) PREPARATION OF N-(2-CHLOROETHYL)-N-(2-O-TOLOXYETHYL)-1-NAPHTHYLMETHYL-AMINE HYDROCHLORIDE

N - (1 - naphthylmethyl) - N - (2 - o - toloxyethyl) - 2 - aminoethanol, 26.8 grams in 100 cc. of chloroform.

Thionyl chloride, 12.0 grams in 100 cc. of chloroform.

The thionyl chloride solution was dropped during 2 hours into the amino alcohol solution, the contents being stirred in a 500 cc. round bottom flask fitted with mercury seal, stirrer, dropping funnel and reflux condenser. The flask was cooled with an ice bath during this operation. After standing for a few hours at room temperature, the solvent was removed by distillation at atmospheric pressure. The residue, obtained in the form of a dark resin, was refluxed for 15 minutes with 80 cc. of absolute alcohol in the presence of 5 grams decolorizing carbon. The filtered solution was mixed with 100 cc. of ether and the compound was permitted to crystallize in the refrigerator. The crystals were separated by filtration and the purification process was repeated using 200 cc. of absolute alcohol, 5 grams carbon and 600 cc. of ether.

10 grams of a white compound with a M. P. of 172.8°–175.8° C. (corrected) were obtained.

| Analysis | Calculated | Found |
|---|---|---|
| Percent Cl ionized | 9.1 | 9.2 |
| Percent Cl total | 18.2 | 17.9 |

EXAMPLE 6

*Preparation of N-(2-chloroethyl)-N-(2-o-isopropylphenoxyethyl)-benzylamine hydrochloride.*

(a) PREPARATION OF N-(2-O-ISOPROPYLPHENOXYETHYL)-2-AMINO ETHANOL 2-bromoethyl-o-isopropylphenyl ether was prepared as follows:

| | |
|---|---|
| o-Isopropylphenol | 556.0 grams |
| Ethylene dibromide | 939.5 grams |
| Sodium hydroxide | 155.0 grams in 300 cc. of water |
| Water | 600 cc. |

The sodium hydroxide solution was dropped during 2 hours into the mixture of bromide, water and o-isopropylphenol being vigorously stirred and refluxed in a 4 liter round bottom flask fitted with mercury seal, reflux condenser, stirrer and dropping funnel. Refluxing and stirring were then continued for 12 hours. After cooling to room temperature, the oily layer was separated from the aqueous layer and washed with 500 cc. of water after addition of 300 cc. of benzene. The benzene was removed by distillation in low vacuum after drying the solution with anhydrous sodium sulfate. The residual oil was distilled in high vacuum. The following fractions were obtained:

(1) At 50–60 mm., 55–100° C., 326.0 grams, ethylene dibromide recovered.
(2) At 5 mm., 70–90° C., 455.1 grams, o-isopropylphenol recovered.
(3) At 5 mm., 90–110° C., 25.2 grams.
(4) At 5 mm., 110–125° C., 72.1 grams.

Fraction 4 was redistilled. The following fractions were obtained:

(1a) At 4 mm., 105–115° C., 2.7 grams.
(2b) At 4 mm., 115–129° C., 62.5 grams, nearly colorless oil.

Fraction 2b is the desired material; purity 95% (determined by potentiometric titration); $n_D^{20}$ 1.5350.

60 grams of the bromo ether were dropped during 2 hours at 110° C. inside temperature into 80 grams of 2-aminoethanol, the mixture being stirred in a 500 cc. round bottom flask fitted with dropping funnel, mercury seal, stirrer and reflux condenser. Heating to 110° C. was then continued for 4 hours. After cooling to room temperature, 10 grams of sodium hydroxide in 10 cc. of water and 200 cc. of alcohol were added and the precipitated salt was separated by filtration. The solvent and the excess of 2-aminoethanol were removed by distillation in low vacuum. High vacuum distillation yielded the following fractions:

(1) At 4 mm., 65–170° C., 5.0 grams.
(2) At 4 mm., 170–185° C., 41.1 grams.

Fraction 2 was redistilled.

(1a) At 4 mm., until 175° C., 1.0 gram.
(2b) At 4 mm., 175–185° C., 34.0 grams, nearly colorless oil.

Fraction 2b, the desired material, had a purity of 99% (determined by potentiometric titration); $n_D^{20}$ 1.5252.

(b) PREPARATION OF N-BENZYL-N-(2-O-ISOPROPYLPHENOXYETHYL)-2-AMINOETHANOL

| | Grams |
|---|---|
| N - (2 - o - isopropylphenoxyethyl) - 2 - aminoethanol | 40 |
| Benzyl chloride | 24 |
| Anhydrous potassium carbonate | 50 |

The benzyl chloride was dropped at 110° C. inside temperature during 30 minutes into the stirred mixture of the amino alcohol and potassium carbonate. Stirring was then continued for 6 hours while the temperature was increased to 150° C. 200 cc. of a 10% aqueous caustic soda solution were added after the reaction mixture had been allowed to cool to 60° C. The organic matter was shaken out with 300 cc. of benzene and the solution which was obtained was prepared in the usual manner for high vacuum distillation. The following fractions were separated:

(1) At 5 mm., 145–230° C., 5 grams.
(2) At 5 mm., 230–260° C., 29.4 grams.
(3) At 5 mm., 260–270° C., 5 grams.

Fraction 2 was redistilled.

(1a) At 4 mm., until 225° C., 1.3 grams.
(2b) At 4 mm., 225–240° C., 21.2 grams, brownish oil; purity 97% (by potentiometric titration).

(c) PREPARATION OF N-(2-CHLOROETHYL)-N-(2-O-ISOPROPYLPHENOXYETHYL)-BENZYLAMINE HYDROCHLORIDE

N - benzyl - N - (2 - o - isopropylphenoxyethyl) - 2-aminoethanol, 20 grams in 100 cc. of chloroform.

Thionyl chloride, 10 grams in 100 cc. of chloroform.

The thionyl chloride was brought to reaction with the amino alcohol in the usual manner. The residue which was obtained after distillation of the solvent was solid. Purification was carried out as described for similar compounds with 80 cc. of alcohol, 5 grams decolorizing carbon and 1,000 cc. of ether and finally with 80 cc. of alcohol, 5 grams of carbon and 500 cc. of ether. A temperature of −10° C. had to be applied since no crystallization could be accomplished in the refrigerator.

13 grams of a white substance were obtained with a M. P. of 127°–129° C.

| Analysis | Calculated | Found |
|---|---|---|
| Percent Cl ionized | 9.6 | 9.5 |
| Percent Cl total | 19.3 | 19.2 |

EXAMPLE 7

*Preparation of N-(2-chloroethyl)-N-(2-o-ethylphenoxyethyl)-benzylamine hydrochloride*

(a) PREPARATION OF N-(2-O-ETHYLPHENOXYETHYL)-2-AMINOETHANOL

This was prepared in similar manner as that described in Example 6, part (a). Here, 51 grams of the 2-bromoethyl-o-ethylphenyl ether yielded 28.9 grams of the desired amino alcohol, boiling at 165°–175° C. under a pressure of 4 mm. of mercury.

(b) PREPARATION OF N-BENZYL-N-(2-O-ETHYLPHENOXYETHYL)-2-AMINOETHANOL

A mixture of 27 grams of N-(2-o-ethylphenoxyethyl)-2-aminoethanol, 17 grams of benzyl chloride and 50 grams of anhydrous potassium carbonate was heated for 15 minutes at 120° C. and then for 10 hours at 150° C. following the general procedure described for the preparation of N-benzyl - N - (2 - o-isopropylphenoxyethyl)-2-aminoethanol. The yield amounted to 22.7 grams of a brown oil possessing a boiling range of 220°–235° C. at 4 mm. pressure.

(c) PREPARATION OF N-(2-CHLOROETHYL)-N-(2-O-ETHYLPHENOXYETHYL)-BENZYLAMINE HYDROCHLORIDE

N - benzyl - N - (2 - o - ethylphenoxyethyl) - 2-aminoethanol, 21 grams in 100 cc. of chloroform.

Thionyl chloride, 10 grams in 100 cc. of chloroform.

Following the procedure of Example 6, part (c), a yield of 5 grams of white crystals (M. P. 116°–118° C.) was obtained.

| Analysis | Calculated | Found |
|---|---|---|
| Percent Cl total | 20.0 | 20.2 |

EXAMPLE 8

*Preparation of N-(2-chloroethyl)-N-(2-o-toloxyethyl)-ethylamine hydrochloride*

(a) PREPARATION OF N-ETHYL-N-(2-O-TOLOXYETHYL)-2-AMINOETHANOL

This compound was prepared from commercial N-ethyl-2-aminoethanol and 2 - chloroethyl-o-tolylether (prepared as in Example 5, part (b). These substances were heated at 100° C. for 6 hours and the crude reaction product was isolated. The purified end product had a boiling range of 166°–170° C. under 4 mm. pressure, and possessed a purity of 100.5% and a refractive index of 1.5200.

(b) PREPARATION OF N-(2-CHLOROETHYL)-N-(2-O-TOLOXYETHYL)-ETHYLAMINE HYDROCHLORIDE

N-ethyl-N-(2-o-toloxyethyl)-2-aminoethanol, 57 grams in 100 cc. of chloroform.

Thionyl chloride, 45 grams in 100 cc. of chloroform.

Following the procedure of Example 6, part (c), a yield of 49 grams of white crystals with a M. P. of 125°–127° C. was obtained.

| Analysis | Calculated | Found |
|---|---|---|
| Percent Cl ionized | 12.8 | 12.6 |
| Percent Cl total | 25.5 | 25.4 |

EXAMPLE 9

*Preparation of N-(2-chloroethyl)-N-(2-o-toloxyethyl)-benzylamine hydrochloride*

(a) PREPARATION OF N-BENZYL-N-(2-O-TOLOXYETHYL)-2-AMINOETHANOL

|  | Grams |
|---|---|
| N-benzyl-2-aminoethanol | 110 |
| 2-chloroethyl-o-tolyl ether | 60 |

The starting materials were charged into a 1 liter round bottom flask fitted with stirrer, reflux condenser and thermometer. The mixture was then heated 6 hours to 160°–170° C. and a solution of 150 grams of caustic soda in 500 cc. of water was added and the organic matter was then shaken out with 500 cc. of benzene. The benzene solution was dried with anhydrous sodium sulfate and filtered.

High vacuum distillation yielded, after removal of the solvent at atmospheric pressure, the following fractions (an 8 inch asbestos covered Vigraux column was used):

(1) At 4 mm., 135–210° C., 44.8 grams.
(2) At 4 mm., 210–230° C., 80.1 grams.

Fraction 2 was redistilled.

(1a) At 4 mm., 202–215° C., 8.9 grams.
(2b) At 4 mm., 215–223° C., 64.2 grams, yellow oil.

Fraction 2b, the desired material, possessed a purity of 101% (determined by potentiometric titration); $n_D^{20}$ 1.5590.

(b) PREPARATION OF N-(2-CHLOROETHYL)-N-(2-O-TOLOXYETHYL)-BENZYLAMINE HYDROCHLORIDE

N-benzyl-N-(2-o-toloxyethyl) - 2 - aminoethanol, 60 grams in 150 cc. of chloroform.

Thionyl chloride, 30 grams in 150 cc. of chloroform.

The amino alcohol solution was charged into a 1 liter round bottom flask being cooled in an ice bath and fitted with stirrer, dropping funnel and reflux condenser, the top of which was connected to an absorption implement for $SO_2$ and HCl. The thionyl chloride solution was added during 2 hours to the stirred contents of the flask. After removal of the ice bath the reaction product was allowed to remain at room temperature overnight. The solvent was removed by distillation at atmospheric pressure; a vigorous development of $SO_2$ could be noticed at this stage.

The solid residue was moistened with 30 cc. of alcohol and this solvent was removed by distillation in low vacuum. Purification was accomplished by refluxing the residue to complete solution with 150 cc. of #30 alcohol in the presence of 5 grams of decolorizing carbon, filtration, addition of 200 cc. of ether to the warm, stirred filtrate and subsequent crystallization in the refrigerator. A second crystallization using 150 cc. of alcohol, 5 grams of carbon and 350 cc. of ether yielded the final product in a yield of 43.5 grams of white crystals, melting at 142.3°–143.5° C. (corrected).

| Analysis | Calculated | Found |
|---|---|---|
| Percent Cl total | 20.8 | 21.1 |

EXAMPLE 10

*Preparation of N-(2-chloroethyl)-N-(2-o-methoxy-phenoxyethyl)-benzylamine hydrochloride*

(a) PREPARATION OF 2-(O-METHOXYPHENOXY) ETHANOL

| | |
|---|---|
| Guaiacol | 620 grams |
| Ethylene chlorohydrin | 400 grams |
| Sodium hydroxide | 200 grams in 200 cc. of water |
| Alcohol | 1000 cc. |

The ethylene chlorohydrin was dropped during 2 hours into the solution of the other components being stirred and refluxed in a four liter round bottom flask fitted with mercury seal, reflux condenser, dropping funnel and stirrer. Refluxing and agitating were then continued for 6 hours. After separating the salt by filtration, the alcohol was removed by distillation in low vacuum. The residual oil was dissolved in 500 cc. of benzene. This solution was washed with 300 cc. of a 10% aqueous caustic solution, then with 500 cc. of water and finally dried with anhydrous sodium sulfate. The residue which was obtained after separating the salt by filtration and removal of the solvent yielded the following fractions when distilled in high vacuum:

(1) At 5 mm., until 133° C., 13.2 grams.
(2) At 5 mm., 133–136° C., 546.0 grams, desired material; purity of 97.6% (determined by potentiometric titration); $n_D^{20}$ 1.5418.

(b) PREPARATION OF (2-CHLOROETHYL)-O-METHOXYPHENYL ETHER 2-(o-methoxyphenoxy)-ethanol, 510 grams in 500 cc. of chloroform.
Pyridine, 250 grams.
Thionyl chloride, 400 grams in 500 cc. of chloroform.

The procedure of Example 5, part (b) was followed.

High vacuum distillation yielded at 4 mm. pressure a fraction boiling from 123°–129° C. which congealed (M. P. 41°–43° C.). Purity of 102% was based on chlorine determination.

(c) PREPARATION OF N-BENZYL-N-(2-O-METHOXYPHENOXYETHYL)-2-AMINOETHANOL

| | Grams |
|---|---|
| 2-chloroethyl-o-methoxyphenyl ether | 56.0 |
| N-benzyl-2-aminoethanol | 95.0 |

The components were stirred and heated for 3 hours to 180° C. in a 500 cc. round bottom flask fitted with stirrer, mercury seal, thermometer and reflux condenser. 300 cc. of a 10% aqueous sodium hydroxide solution were then added and the amino alcohols were shaken out with 300 cc. of benzene. The benzene solution was washed with 500 cc. of water, dried with anhydrous sodium sulfate, filtered from the salt and finally distilled in vacuum. After removal of the benzene, the following fractions were separated:

(1) At 5 mm., 140–225° C., 57.3 grams.
(2) At 5 mm., 225–255° C., 47.7 grams.

Fraction 2 was redistilled.

(1a) At 5 mm., 215–230° C., 5.1 grams.
(2b) At 5 mm., 230–245° C., 34.5 grams, desired material; purity 102% (determined by potentiometric titration); $n_D^{20}$ 1.5640.

(d) PREPARATION OF N-(2-CHLOROETHYL)-N-(2-O-METHOXYPHENOXYETHYL)-BENZYLAMINE HYDROCHLORIDE

N-benzyl-N-(2-o-methoxyphenoxyethyl)-2-aminoethanol, 32 grams in 100 c. of chloroform.
Thionyl chloride, 15 grams in 100 cc. of chloroform.

Following the procedure used in Example 6, part (c), 9 grams of white crystals, M. P. 127.3°–129.5° C. (corrected), were obtained.

| Analysis | Calculated | Found |
|---|---|---|
| Percent Cl total | 19.9 | 20.5 |

EXAMPLE 11

*Preparation of N-(2-chloroethyl)-N-(2-o-methoxyphenoxyethyl)-2-o-toloxyethylamine hydrochloride*

(a) PREPARATION OF 2-BROMOETHYL-O-METHOXYPHENYL ETHER

| | |
|---|---|
| Guaiacol | 500 grams. |
| Ethylene dibromide | 940 grams |
| Sodium hydroxide | 155 grams in 250 cc. of water. |
| Water | 500 cc. |

Guaiacol, ethylene dibromide and water were charged into a 4 liter round bottom flask fitted with stirrer, dropping funnel and reflux condenser. The sodium hydroxide solution was then dropped during 2 hours into the vigorously stirred and refluxing mixture. Agitating and refluxing were continued for 20 hours. After cooling to room temperature, the aqueous fraction was separated from the oily layer; the latter one was mixed with 500 cc. of benzene and the benzene solution was washed with 500 cc. of water and dried with anhydrous sodium sulfate. The benzene was removed in low vacuum and the residual liquid was submitted to high vacuum distillation.

The following fractions were obtained:

(1) At 70–80 mm., 60–100° C., 279.0 grams.
(2) At 4 mm., 70–100° C., 128.6 grams.
(3) At 4 mm., 100–130° C., 298.9 grams.

Fraction 3 was redistilled.
(1a) At 4 mm., 85–120° C., 17.6 grams.
(2b) At 4 mm., 120–130° C., 272.4 grams.

Fraction 2b represented the desired compound and possessed a purity of 96% (determined by potentiometric titration).

(b) PREPARATION OF N-(2-O-METHOXYPHENOXYETHYL)-2-AMINOETHANOL

| | Grams |
|---|---|
| 2-bromoethyl-o-methoxyphenyl ether | 96.0 |
| 2-aminoethanol | 100.0 |

The bromo ether was dropped during one hour at 100°–120° C. into the amino alcohol being stirred and heated in a 500 cc. round bottom flask fitted with mercury seal, dropping funnel, reflux condenser, thermometer and stirrer. Heating to 120° C. was then continued for 6 hours. After cooling to room temperature, a solution of 16 grams of sodium hydroxide in 20 cc. of water and 200 cc. of alcohol were added to precipitate the salt. The solvent was removed by distillation in low vacuum after the salt had been filtered off.

High vacuum distillation yielded the following fractions:

(1) At 4 mm., 60–180° C., 79.4 grams.
(2) At 4 mm., 180–205° C., 69.7 grams.

Fraction 2 was redistilled.

(1a) At 4 mm., 70–185° C., 6.0 grams.
(2b) At 4 mm., 185–200° C., 53.0 grams, desired material.

(c) PREPARATION OF N-(2-O-METHOXYPHENOXYETHYL)-N-(2-O-TOLOXYETHYL)-2-AMINOETHANOL

| | Grams |
|---|---|
| N-(2-o-methoxyphenoxyethyl)-2-aminoethanol | 21.1 |
| 2-bromoethyl-o-tolyl ether | 21.5 |
| Anhydrous potassium carbonate | 50.0 |

The halogen compound, prepared as in part (a) of this example except that o-cresol was used here in place of guaiacol, was dropped during 10 minutes at 110° C. into the stirred mixture of the amino alcohol and potassium carbonate. The temperature was then increased for 7 hours to 140°–150° C. After cooling to 60° C., 200 cc. of a 20% aqueous sodium hydroxide solution were added and the organic matter was shaken out with 200 cc. of benzene. Drying with anhydrous sodium sulfate, filtration and removal of the solvent by distillation in low vacuum made the residue ready for high vacuum distillation.

(1) At 4 mm., 120–250° C., 4.4 grams.
(2) At 4 mm., 250–270° C., 16.7 grams.

Fraction 2 was redistilled.

(1a) At 4 mm., 190–255° C., 1.0 gram.
(2b) At 4 mm., 255–270° C., 11.4 grams, brown oil.

Fraction 2b, the desired material, had a purity of 94% (determined by potentiometric titration).

(d) PREPARATION OF N-(2-CHLOROETHYL)-N-(2-O-METHOXYPHENOXYETHYL)-2 - O - TOLOXYETHYLAMINE

N - (2 - o - methoxyphenoxyethyl) - N - (2 - o-toloxyethyl)-2-aminoethanol, 10 grams in 100 cc. of chloroform.
Thionyl chloride, 6 grams in 100 cc. of chloroform.

Thionyl chloride and the amino alcohol were treated as in Example 6, part (c). The resin which was obtained after removal of the solvent by distillation was purified and brought to crystallization by refluxing it with 100 cc. of alcohol in the presence of 5 grams decolorizing carbon, filtration, addition of 500 cc. of ether and subsequent crystallization in the refrigerator. This purification process was repeated twice using 50 cc. of alcohol, 5 grams carbon, 250 cc. of ether and 50 cc. of isopropanol, 5 grams carbon, 100 cc. of ether.

The yield of white crystals amounted to 4.1 grams. The M. P. was 121°–123° C.

| Analysis | Calculated | Found |
|---|---|---|
| Percent Cl total | 17.7 | 17.7 |

EXAMPLE 12

Preparation of N-(2-chloroethyl)-N-(2-p-methoxyphenoxyethyl)-benzylamine hydrochloride (a) PREPARATION OF 2-BROMOETHYL-P-METHOXYPHENYL ETHER This was prepared in accordance with the procedure of Example 11, part (a), using hydroquinone monomethyl ether in place of guaiacol.

The desired product boiled at 130°–138° C. under a pressure of 4 mm. of mercury and solidified on standing.

(b) PREPARATION OF N-(2-P-METHOXYPHENOXYETHYL)-2-AMINOETHANOL

| | Grams |
|---|---|
| 2-bromoethyl-p-methoxyphenyl ether | 96.0 |
| 2-aminoethanol | 100.0 |

The procedure as described in Example 11, part (b) was followed.

High vacuum distillation yielded the following fractions:

(1) At 4 mm., 70–190° C., 5.0 grams.
(2) At 4 mm., 190–200° C., 76.1 grams.

Fraction 2 was redistilled.

(1a) At 4 mm., until 193° C., 2.0 grams.
(2b) At 4 mm., 193–200° C., 55.2 grams, solid.

Fraction 2b, the desired material, had a purity of 100% (determined by potentiometric titration).

(c) PREPARATION OF N-BENZYL-N-(2-P-METHOXYPHENOXYETHYL)-2-AMINOETHANOL

| | Grams |
|---|---|
| 2 - (p - methoxyphenoxyethyl) - aminoethanol | 42.0 |
| Benzyl chloride | 25.4 |
| Potassium carbonate | 50.0 |

The benzyl chloride was dropped during 1 hour at 110° C. inside temperature into the stirred mixture of the amino alcohol and potassium carbonate. Heating to 110° C. was continued for 3 hours and then finally to 160° C. for 2 hours. 200 cc. of a 20% aqueous sodium hydride solution were then added and the organic matter was shaken out with 300 cc. of benzene. The solution was washed with water, dried with anhydrous sodium sulfate, filtered and distilled in vacuum.

The following fractions were obtained after removal of the benzene:

(1) At 4 mm., 150–250° C., 3.8 grams.
(2) At 4 mm., 250–260° C., 44.7 grams.

Fraction 2 was redistilled.

(1a) At 4 mm., until 246° C., 1.0 gram.
(2b) At 4 mm., 246–250° C., 37.7 grams, brown oil.

Fraction 2b represented the desired compound with a purity of 100% (determined by potentiometric titration); $n_D^{20}$ 1.6195.

(d) PREPARATION OF N-(2-CHLOROETHYL)-N-(2-P-METHOXYPHENOXYETHYL) - BENZYLAMINE HYDROCHLORIDE

N - benzyl - N - (2 - p - methoxyphenoxyethyl)-2-aminoethanol, 34.0 grams in 100 cc. of chloroform.
Thionyl chloride, 25.0 grams in 100 cc. of chloroform.

The procedure of Example 6, part (c) was followed. Crystallizations were carried out with 100 cc. of alcohol, 5 grams of decolorizing carbon, 300 cc. of ether and finally with 150 cc. of alcohol, 5 grams of carbon and 400 cc. of ether.

The yield of desired material in the form of white crystals, with a melting point of 140°–142° C., amounted to 30 grams.

| Analysis | Calculated | Found |
|---|---|---|
| Percent Cl ionized | 10.0 | 9.9 |
| Percent Cl total | 19.9 | 20.2 |

EXAMPLE 13

*Preparation of N-(2-chloroethyl)-N-(2-o-methoxyphenoxyethyl)-ethylamine hydrochloride*

(a) PREPARATION OF N-ETHYL-N-(2-O-METHOXYPHENOXYETHYL)-2-AMINOETHANOL

| | Grams |
|---|---|
| 2-chloroethyl-o-methoxyphenyl ether | 75 |
| N-ethyl-2-aminoethanol | 75 |

The components were stirred and heated for 3 hours to 180° C. in a 500 cc. flask fitted with mercury seal, stirrer, thermometer and reflux condenser. The procedure was continued as described in Example 10, part (c).

High vacuum distillation yielded the following fractions:

(1) At 5 mm., 150–175° C., 4.0 grams.
(2) At 5 mm., 175–185° C., 39.0 grams.

Fraction 2 was redistilled.

(1a) At 5 mm., until 177° C., 1.0 gram.
(2b) At 5 mm., 177–180° C., 33.7 grams, yellow oil.

Fraction 2b, the desired compound, had a purity of 101% (determined by potentiometric titration); $n_D^{20}$ 1.5245.

(b) PREPARATION OF N-(2-CHLOROETHYL))-N-(2-O-METHOXYPHENOXYETHYL)-ETHYLAMINE HYDROCHLORIDE

N-ethyl-N-(2-o-methoxyphenoxyethyl)-2-aminoethanol, 30.8 grams in 100 cc. of chloroform.

Thionyl chloride, 20.0 grams in 100 cc. of chloroform.

The procedure of Example 6, part (c) was followed. Purification and crystallization were conducted with:

(1) 80 cc. of alcohol, 5 grams carbon and 290 cc. of ether; and
(2) 100 cc. of alcohol, 5 grams carbon and 200 cc. of ether.

The yield was 26 grams of white crystals with a M. P. of 125°–128° C.

| Analysis | Calculated | Found |
|---|---|---|
| Percent Cl total | 24.1 | 24.2 |

EXAMPLE 14

*Preparation of N-(2-chloropropyl)-di-(2-o-toloxyethyl)-amine hydrochloride*

(a) PREPARATION OF N,N-DI-(2-O-TOLOXYETHYL)-1-AMINO-2-PROPANOL

| | Grams |
|---|---|
| 2-chloroethyl-o-tolyl ether | 170.45 |
| 1-amino-2-propanol | 75.0 |

The halogen compound was dropped during 2 hours at 110°–120° C. into the stirred amino alcohol. A temperature of 150°–160° C. was then maintained for 6 hours. After cooling to room temperature, 200 cc. of a 20% aqueous sodium hydroxide solution were added and the mixture was extracted with 200 cc. of benzene. The benzene solution was then washed with 200 cc. of water, dried with anhydrous sodium sulfate, filtered, and distilled.

High vacuum distillation yielded, after removal of the benzene, the following fractions:

(1) At 5 mm., 88–216° C., 30.7 grams.
(2) At 5 mm., 218–258° C., 107.6 grams.

Fraction 2 was redistilled; the desired substance collected at a boiling range from 229°–249° C. at 5 mm. A yield of 35.7 grams of mushy crystals having a purity of 99% (determined by potentiometric titration) was obtained.

The hydrochloride and nitrate of this base are white crystalline solids, melting respectively at 124°–126° C. and 153°–155° C.

(b) PREPARATION OF N-(2-CHLOROPROPYL)-DI-(2-O-TOLOXYETHYL)-AMINE HYDROCHLORIDE

N,N-di-(2-o-toloxyethyl)-1-amino-2-propanol, 20 grams in 100 cc. of chloroform.

Thionyl chloride, 20 grams in 100 cc. of chloroform.

The components were brought to reaction and the reaction product was worked up as described in Example 5, part (d).

Crystallizations were carried out with (1) 80 cc. of alcohol, 5 grams decolorizing carbon, and 600 cc. of ether; and
(2) 75 cc. of alcohol, 5 grams decolorizing carbon, and 1,000 cc. of ether.

The yield of slightly cream-colored crystals, with a M. P. of 140°–141.5° C. (corrected), amounted to 7 grams.

| Analysis | Calculated | Found |
|---|---|---|
| Percent Cl ionized | 8.9 | 8.7 |
| Percent Cl total | 17.9 | 18.4 |

EXAMPLE 15

*Preparation of N-(2-chloroethyl)-N-(2-o-toloxyethyl)-benzylamine methanesulfonate*

(a) PREPARATION OF N-(2-CHLOROETHYL)-N-(2-O-TOLOXYETHYL)-BENZYLAMINE 60 grams of N-(2-chloroethyl)-N-(2-o-toloxyethyl)-benzylamine hydrochloride were stirred rapidly for 2 hours with 300 cc. of an aqueous, saturated solution of potassium carbonate. The formed base, a nearly colorless oil, was extracted with benzene. The benzene solution was washed twice with water and dried with anhydrous sodium sulfate. After filtration and removal of the solvent at reduced pressure, the residual oil was dried in high vacuum at 90° C. 50 grams of a brownish oil remained.

| Analysis | Calculated | Found |
|---|---|---|
| Percent Cl | 11.7 | 12.1 |

(b) PREPARATION OF N-(2-CHLOROETHYL)-N-(2-O-TOLOXYETHYL)-BENZYLAMINE METHANESULFONATE 15 grams of N-(2-chloroethyl)-N-(2-o-toloxyethyl)-benzylamine were dissolved in 50 cc. of acetone and 5 grams of methane sulfonic acid, dissolved in 25 cc. of acetone, were added, drop by drop, under stirring. The acetone was removed from the solution under reduced pressure and the residue dried in high vacuum at 100° C. The desired compound remained as a brownish, very viscous oil which did not crystallize on long standing.

| Analysis | Calculated | Found |
|---|---|---|
| Percent Cl | 8.8 | 8.2 |

EXAMPLE 16

*Preparation of N-(2-chloroethyl)-N-(2-o-isopropylphenoxyethyl)-ethylamine hydrochloride*

(a) PREPARATION OF 2-(O-ISOPROPYLPHENOXY)-ETHANOL 450 grams of ethylene chlorohydrin were dropped during 3 hours into a stirred and refluxing solution of 540 grams of o-isopropylphenol and 200 grams of sodium hydroxide in 1000 ml. of alcohol and 200 ml. of water. Refluxing was then continued for 5 hours. After cooling and filtration, the solvent was removed by distillation at reduced pressure. The residue was poured into water, the organic matter extracted with benzene and the benzene solution washed with diluted caustic and finally with water. The benzene was distilled off after drying with anhydrous sodium sulfate and filtration. The desired compound distilled at 4 mm. pressure of mercury at 117–127° C. The yield of the nearly colorless oil amounted to 524.6 grams; $n_D^{20}$ 1.5200; purity 101% (determined by acetylation).

(b) PREPARATION OF β-CHLORO-O-ISOPROPYL-PHENETOLE 270 grams of thionyl chloride dissolved in 300 ml. of ethylene dichloride were dropped during 2 hours into a stirred and cooled solution of 360 grams of the above hydroxy ether in 500 ml. of ethylene dichloride and 180 grams of pyridine. After standing at room temperature for 20 hours, the reaction product was heated under reflux for 2 hours on the steam bath. The warm solution was washed twice with 500 ml. of water and dried with anhydrous sodium sulfate. After removal of the solvent by distillation, 344 grams of the desired compound, a colorless oil, distilled at a pressure of 4 mm. of mercury at 105–110° C.; $n_D^{20}$ 1.5180; purity 100.0% (by chlorine determination).

(c) N-ETHYL-N-(2-O-ISOPROPYLPHENOXYETHYL)-2-AMINOETHANOL 140 grams of the above chloride was dropped during 2 hours into 140 grams of N-ethyl-2-aminoethanol being stirred and heated to 110° C. Heating was then continued for 5 hours at 160–170° C. After cooling to room temperature, 200 ml. of a 20% aqueous sodium hydroxide solution were added, the amino alcohols were shaken out with 500 ml. of benzene, this solution was dried, filtered and finally distilled. The amino alcohol boiled at 168–178° C. at 4 mm. pressure of mercury. Yield 143 grams; $n_D^{20}$ 1.5113; purity 100.5% (by potentiometric titration).

(d) N-(2-CHLOROETHYL)-N-(2-O-ISOPROPYLPHEN-OXYETHYL)-ETHYLAMINE HYDROCHLORIDE 125.5 grams of the above amino alcohol dissolved in 200 ml. of chloroform were brought to reaction with 65.0 grams of thionyl chloride dissolved in 100 ml. of chloroform by slow addition of the thionyl chloride to the cooled amino alcohol solution. After reacting for 20 hours at room temperature, the solvent was distilled off at atmospheric pressure. The residue was refluxed with 250 ml. of alcohol in the presence of some decolorizing carbon, the solution was filtered, mixed with 1,500 ml. of isopropyl ether and allowed to crystallize. The crystals were isolated by filtration and purified by repeating the above process using 100 ml. of alcohol, carbon and 1,000 ml. of isopropyl ether. The final yield of nearly white crystals, with a M. P. of 131–133° C. (corrected), amounted to 82 grams.

| Analysis | Calculated | Found |
|---|---|---|
| Percent Cl ionized | 11.6 | 11.7 |
| Percent Cl total | 23.2 | 23.2 |

EXAMPLE 17

Preparation of N-(2-chloroethyl)-N-(2-m,p-dimethylphenoxyethyl)-benzylamine hydrochloride (a) 2-(M,P-DIMETHYLPHENOXY)-ETHANOL 122.2 grams of 4-hydroxyl-1,2-dimethyl benzene dissolved in a solution of 40.0 grams of sodium hydroxide in 60 ml. of water and 500 ml. of alcohol, were brought to reaction with 100.0 grams of ethylene chlorohydrin as described in paragraph (a) of Example 16.

The yield of the hydroxy ether with a B. P. of 130–140° C. at 4 mm. pressure of mercury amounted to 110.3 grams.

(b) β-CHLORO-M,P-DIMETHYLPHENETOLE

A solution of 100.0 grams of the above hydroxy ether in 300 ml. of chloroform and 48.0 grams of pyridine were brought to reaction with 75.0 grams of thionyl chloride dissolved in 300 ml. of chloroform as described in paragraph (b) of Example 16.

The yield of the desired product, a nearly colorless oil amounted to 62.9 grams; B. P. (at 4 mm. mercury) 116–118° C.; purity 100% (by chlorine determination).

(c) N-BENZYL-N-(2-M,P-DIMETHYLPHENOXY-ETHYL)-2-AMINOETHANOL 19.0 grams of the above chloride were brought to reaction with 40.0 grams of 2-benzyl-aminoethanol as described in paragraph (c) of Example 20.

The amino alcohol went over at 6 mm. mercury from 248–250° C.; yield 17.0 grams; $n_D^{20}$ 1.5572; purity 102% (by potentiometric titration).

(d) N-(2-CHLOROETHYL)-N-(2-M,P-DIMETHYLPHEN-OXYETHYL)-BENZYLAMINE HYDROCHLORIDE

A solution of 15.0 grams of the above amino alcohol in 100 ml. of ethylene dichloride were brought to reaction with a solution of 10.0 grams of thionyl chloride in 100 ml. of ethylene dichloride as described in paragraph (d) of Example 16.

90 ml. of alcohol, 800 ml. of ethyl ether
100 ml. of alcohol, 300 ml. of ethyl ether were used for crystallizations.

Yield 11.6 grams of white crystals; M. P. 150–152° C. (corrected).

| Analysis | Calculated | Found |
|---|---|---|
| Percent Cl ionized | 10.0 | 10.0 |
| Percent Cl total | 20.0 | 19.8 |

EXAMPLE 18

Preparation of N-(2-chloroethyl)-N-(o-ethyl-phenoxy-ethyl)-ethylamine hydrochloride (a) 2-(O-ETHYLPHENOXY)-ETHANOL 61.0 grams of o-ethylphenol dissolved in a solution of 20.0 grams of sodium hydroxide in 30 ml. of water and 500 ml. of alcohol were brought to reaction with 55.0 grams of ethylene chlorohydrin as described in paragraph (a) of Example 16.

Yield 19.0 grams; B. P. (4 mm. mercury) 115–125° C.; $n_D^{20}$ 1.5180.

(b) β-CHLORO-O-ETHYLPHENETOLE

A solution of 16.6 grams of the above hydroxy ether in 100 ml. of chloroform and 8.0 grams of pyridine were brought to reaction with 15.0 grams of thionyl chloride in 50 ml. of chloroform as described in paragraph (b) of Example 16.

Yield 13.5 grams; B. P. (4 mm. mercury) 100–110° C.

(c) N-ETHYL-N-(2-O-ETHYLPHENOXYETHYL)-2-AMINOETHANOL 13.0 grams of the above chloride were brought to reaction with 40.0 grams of N-ethyl-2-aminoethanol as described in paragraph (c) of Example 16.

Yield 12.7 grams; B. P. (4 mm. mercury) 160–169° C.; purity 101% (by potentiometric titration).

(d) N-(2-CHLOROETHYL)-N-(2-O-PHENOXYETHYL)-ETHYLAMINE HYDROCHLORIDE

A solution of 11.5 grams of the above amino alcohol in 100 ml. of chloroform were brought to reaction with a solution of 10.0 grams of thionyl chloride in 100 ml. of chloroform as described in paragraph (d) of Example 16.

Yield 4.1 grams of white crystals; M. P. 107–109° C. (corrected).

| Analysis | Calculated | Found |
|---|---|---|
| Percent Cl ionized | 12.1 | 12.1 |
| Percent Cl total | 24.3 | 24.6 |

EXAMPLE 19

*Preparation of N-(2-chloroethyl)-N-(2-thymoxyethyl)-benzylamine hydrochloride*

(a) 2-THYMOXYETHANOL 300.0 grams of thymol
80.0 grams of sodium hydroxide in 150 ml. of water
1000 ml. of alcohol
200.0 grams of ethylene chlorohydrin Procedure as described in paragraph (a) of Example 16. Yield 236.1 grams; B. P. (4 mm. mercury) 120–132° C.; $n_D^{20}$ 1.5157; purity 101% (determined by acetylation).

(b) THYMYL-β-CHLOROETHYL ETHER 130.0 grams of 2-thymoxyethanol dissolved in 300 ml. of chloroform and 54.0 grams of pyridine.
100.0 grams of thionyl chloride dissolved in 100 ml. of chloroform.

Procedure as described in paragraph (b) of Example 16. Yield 96.0 grams; B. P. (3 mm. mercury) 115–119° C.; $n_D^{20}$ 1.5160; Anal. Calcd. for $C_{12}H_{17}OCl$: Cl, 16.7; Found: Cl, 16.2.

(c) N-BENZYL-N-(2-THYMOXYETHYL)-2-AMINOETHANOL 64.0 grams of thymyl-beta-chloroethyl ether
100.0 grams of N-benzyl-2-aminoethanol Procedure as described in paragraph (c) of Example 16. Yield 39.4 grams; B. P. (4 mm. mercury) 232–237° C.; $n_D^{20}$ 1.5472; purity 102% (determined by potentiometric titration).

(d) N-(2-CHLOROETHYL)-N-(2-THYMOXYETHYL)-BENZYLAMINE HYDROCHLORIDE 32.7 grams of N-benzyl-N-(2-thymoxyethyl)-2-aminoethanol dissolved in 100 ml. of chloroform.
16.0 grams of thionyl chloride in 100 ml. of chloroform.

Procedure as described in paragraph (d) of Example 16.
120 ml. of alcohol, 600 ml. of ethyl ether
120 ml. of alcohol, 800 ml. of ethyl ether were used for crystallizations.

Yield 4.9 grams of white crystals; M. P. 135–137° C. (corrected).

| Analysis | Calculated | Found |
|---|---|---|
| Percent Cl ionized | 9.3 | 9.3 |
| Percent Cl total | 18.6 | 18.8 |

EXAMPLE 20

*Preparation of N-(2-chloropropyl)-N-(2-o-isopropylphenoxyethyl)-benzylamine hydrochloride*

(a) N-(2-O-ISOPROPYLPHENOXYETHYL)-1-AMINO-2-PROPANOL 80.0 grams of β-chloro-o-isopropylphenetole prepared according to paragraph (b) in Example 16.
120.0 grams of 1-amino-2-propanol.

The chloride was dropped during 1 hour into the amino alcohol being stirred and heated to 145° C. Heating was then continued for 5 hours at 160° C. After cooling to room temperature, a solution of 16 grams of sodium hydroxide in 30 ml. of water and 300 ml. of alcohol were added. The salt which formed was filtered off and the solution distilled in vacuum. Two distillations at 4 mm. of mercury yielded 63.0 grams of the desired compound with a B. P. of 165–175° C.

Purity 101% (by potentiometric titration); $n_D^{20}$ 1.5112.

(b) N-BENZYL-N-(2-O-ISOPROPYLPHENOXYETHYL)-1-AMINO-2-PROPANOL 16.0 grams of benzyl chloride
59.0 grams of N-(2-o-isopropylphenoxyethyl)-1-amino-2-propanol.

Procedure as described in paragraph (c) of Example 16. Yield 21.0 grams; B. P. (4 mm. of mercury) 230–235° C.; $n_D^{20}$ 1.5390; purity 98% (by potentiometric titration).

(c) N-(2-CHLOROPROPYL)-N-(2-O-ISOPROPYLPHENOXYETHYL)-BENZYLAMINE HYDROCHLORIDE 33.0 grams of the amino alcohol (b) in 100 ml. of chloroform.
16.0 grams of thionyl chloride in 100 ml. of chloroform.

Procedure as described in paragraph (d) of Example 16.
100 ml. of alcohol, 500 ml. of ethyl ether
100 ml. of alcohol, 550 ml. of ethyl ether used for crystallizations.

Yield 8.0 grams of white crystals; M. P. 134–136° C. (corrected).

| Analysis | Calculated | Found |
|---|---|---|
| Percent Cl ionized | 9.3 | 9.2 |
| Percent Cl total | 18.6 | 18.5 |

EXAMPLE 21

*Preparation of N-(2-chloroethyl)-N-(o-methylbenzyl)-2-phenoxyethylamine hydrochloride*

(a) N-(2-PHENOXYETHYL)-2-AMINOETHANOL 200.0 grams of β-bromophenetole
360.0 grams of 2-aminoethanol
40.0 grams of sodium hydroxide in 50 ml. of water
400 ml. of alcohol Procedure as described in paragraph (a) of Example 20. Condensation carried out at 100° C.

Yield 113.5 grams; B. P. (4 mm. of mercury) 170–180° C.; $n_D^{20}$ 1.5373; purity 101% (by potentiometric titration).

(b) N-(2-O-METHYLBENZYL)-N-(2-PHENOXYETHYL)-2-AMINOETHANOL 21.0 grams of o-methylbenzyl chloride 55.0 grams of N-(2-phenoxyethyl)-2-aminoethanol Procedure as described in paragraph (c) of Example 16.

Yield 25.6 grams B. P. (4 mm. of mercury) 225–240° C.

(c) N-(2-CHLOROETHYL)-N-(O-METHYLBENZYL)-2-PHENOXYETHYLAMINE HYDROCHLORIDE 25.6 grams of the above amino alcohol (b) in 100 ml. of chloroform.

20.0 grams of thionyl chloride in 100 ml. of chloroform.

Procedure as described in paragraph (d) of Example 16.

100 ml. of alcohol, 700 ml. of ethyl ether
100 ml. of alcohol, 600 ml. of ethyl ether
40 ml. of alcohol, 250 ml. of ethyl ether
40 ml. of alcohol, 120 ml. of ethyl ether were used for crystallizations.

Yield 5.0 grams of white crystals; M. P. 124–126° C. (corrected).

| Analysis | Calculated | Found |
|---|---|---|
| Percent Cl ionized | 10.5 | 10.9 |
| Percent Cl total | 20.9 | 21.5 |

Similarly, compounds wherein B is

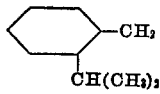

or

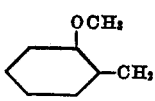

can be formed.

EXAMPLE 22

*Preparation of N-(2-bromoethyl)-N-(2-o-isopropylphenoxyethyl)-benzylamine hydrobromide*

25.6 grams of N-benzyl-N-(2-o-isopropylphenoxyethyl)-2-aminoethanol in 100 ml. of chloroform.

21.0 grams of thionyl bromide in 100 ml. of chloroform.

Procedure as described in paragraph (d) of Example 16.

100 ml. of alcohol, 800 ml. of ether
80 ml. of alcohol, 500 ml. of ether were used for crystallizations.

Yield 10.0 grams; M. P. 143–144° C. (corrected).

| Analysis | Calculated | Found |
|---|---|---|
| Percent bromine ionized | 17.4 | 17.4 |
| Percent bromine total | 35.0 | 34.8 |

This application is a continuation-in-part application of our co-pending applications, Serial Nos. 781,762, filed October 23, 1947 and 30,737, filed June 2, 1948, both now abandoned. The hydroxy amines disclosed herein are claimed in application, Serial No. 237,282, filed simultaneously herewith.

The foregoing illustrates the invention, which however is not to be limited thereby but is to be construed as broadly as permissible in view of the prior art and limited solely by the appended claims.

We claim:

1. A compound of the class consisting of a free base and acid addition salts with an acid selected from the group consisting of an inorganic acid and a lower alkane sulfonic acid, said free base having the formula

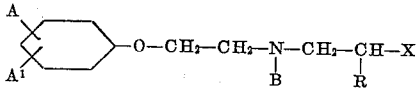

wherein A and $A^1$ are selected from H, lower alkyl and lower alkoxy, B is selected from lower alkyl, 1-naphthylmethyl, benzyl, lower alkyl-substituted benzyl, lower alkoxy-substituted benzyl, 2-phenoxyethyl, lower alkyl-substituted 2-phenoxyethyl and lower alkoxy-substituted 2-phenoxyethyl, R is selected from H and lower alkyl, and X is a member selected from the group consisting of chlorine, bromine and iodine.

2. N-(2-chloroethyl)-N-(2-phenoxyethyl)-benzylamine hydrochloride.

3. N-(2-chloroethyl)-di-(2-phenoxyethyl)-amine hydrochloride.

4. N-(2-chloroethyl)-di-(2-o-toloxyethyl)-amine hydrochloride.

5. N-(2-chloroethyl)-N-(2-o-toloxyethyl)-benzylamine hydrochloride.

6. N-(2-chloroethyl)-N-(o-methylbenzyl)-(2-phenoxyethyl)-amine hydrochloride.

References Cited in the file of this patent

UNITED STATES PATENTS

| Number | Name | Date |
|---|---|---|
| 2,495,772 | Rieveschl et al. | Jan. 31, 1950 |
| 2,599,001 | Kerwin et al. | June 3, 1952 |

OTHER REFERENCES

Wheatley et al.: J. A. C. S., vol. 72, 1950, pp. 1655–1658.

Nicherson et al.: J. of Pharm. and Exp. Therap., vol. 97 (1949), pp. 25–47.